United States Patent
Beaver, III et al.

(10) Patent No.: US 9,436,963 B2
(45) Date of Patent: *Sep. 6, 2016

(54) VISUALIZING A CUSTOM PRODUCT IN SITU

(71) Applicant: Zazzle, Inc., Redwood City, CA (US)

(72) Inventors: Robert Irven Beaver, III, San Francisco, CA (US); Leslie Young Harvill, El Granada, CA (US); Richard Harold Bean, Cupertino, CA (US)

(73) Assignee: Zazzle Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/181,544

(22) Filed: Feb. 14, 2014

(65) Prior Publication Data

US 2014/0160118 A1  Jun. 12, 2014

Related U.S. Application Data

(63) Continuation of application No. 13/604,059, filed on Sep. 5, 2012, now Pat. No. 8,654,120, which is a continuation of application No. 13/539,788, filed on Jul. 2, 2012, now Pat. No. 9,147,213.

(60) Provisional application No. 61/529,883, filed on Aug. 31, 2011.

(51) Int. Cl.
*G06T 15/00* (2011.01)
*G06Q 30/06* (2012.01)
(Continued)

(52) U.S. Cl.
CPC ......... *G06Q 30/0643* (2013.01); *G06K 9/4661* (2013.01); *G06Q 30/0621* (2013.01); *G06T 11/00* (2013.01); *G06T 15/00* (2013.01); *G06T 2210/04* (2013.01)

(58) Field of Classification Search
CPC ............................... G06T 19/00; G06T 17/20
USPC ......................................................... 345/419
See application file for complete search history.

(56) References Cited

U.S. PATENT DOCUMENTS

| | | | |
|---|---|---|---|
| 5,039,132 A | 8/1991 | Anderson | |
| 5,615,123 A | 3/1997 | Davidson et al. | |

(Continued)

FOREIGN PATENT DOCUMENTS

| | | |
|---|---|---|
| EP | 1 124 200 A2 | 1/2001 |
| EP | 1 365 358 A2 | 11/2003 |

(Continued)

OTHER PUBLICATIONS

Nima Soltani, Mehmet Yilmax, "Using Augmented-Reality on Planar Surfaces for Previewing Décor Changes". Stanford University EE368 Class Project Spring 2010.*

(Continued)

*Primary Examiner* — Devona Faulk
*Assistant Examiner* — Jin Ge
(74) *Attorney, Agent, or Firm* — Hickman Palermo Becker Bingham LLP

(57) ABSTRACT

Techniques are described for visualizing a product at the actual location in the environment at which the product is to be used or displayed. An embodiment of the approaches described herein may be used in the context of a computer-based system that can receive and store digital images, receive a request to manufacture a custom framed product including an identification of an image to be framed and a type of mat and/or frame, and display a preview image of the custom framed product that simulates the actual appearance of the product as closely as possible. With such a system, the preview image may be highly realistic under idealized lighting and display conditions. A digital asset visualizing the custom product may be built using a data that maps nodes of a reference connectivity graph of a marker to nodes of a candidate connectivity graph.

26 Claims, 7 Drawing Sheets

(51) Int. Cl.
*G06T 11/00* (2006.01)
*G06K 9/46* (2006.01)

(56) References Cited

U.S. PATENT DOCUMENTS

| | | |
|---|---|---|
| 5,764,308 A | 6/1998 | Lee |
| 5,897,622 A | 4/1999 | Blinn |
| 5,999,914 A | 12/1999 | Blinn |
| 6,058,373 A | 5/2000 | Blinn |
| 6,343,287 B1 | 1/2002 | Kumar |
| 6,542,515 B1 | 4/2003 | Kumar |
| 6,591,011 B1 | 7/2003 | Nielsen |
| 6,664,972 B2 | 12/2003 | Eichel et al. |
| 6,725,257 B1 | 4/2004 | Cansler et al. |
| 7,016,869 B1 | 3/2006 | Haeberli |
| 7,062,483 B2 | 6/2006 | Ferrari et al. |
| 7,107,226 B1 | 9/2006 | Cassidy |
| 7,117,293 B1 | 10/2006 | Graziano |
| 7,262,778 B1 | 8/2007 | Edwards et al. |
| 7,376,891 B2 | 5/2008 | Hitchock |
| 7,502,788 B2 | 3/2009 | Balasubramanian |
| 7,617,184 B2 | 11/2009 | Ferrari et al. |
| 7,702,645 B2 | 4/2010 | Khushraj |
| 7,730,053 B2 | 6/2010 | Sauermann |
| 7,734,731 B2 | 6/2010 | Ordille et al. |
| 7,761,397 B2 | 7/2010 | Huelsman et al. |
| 7,831,589 B2 | 11/2010 | Balasubramanian |
| 7,856,434 B2 | 12/2010 | Gluzman Peregrine et al. |
| 7,865,523 B2 | 1/2011 | Caballero et al. |
| 7,885,956 B2 | 2/2011 | Danish et al. |
| 7,930,313 B1 | 4/2011 | Geva |
| 8,023,746 B2 | 9/2011 | Ackley et al. |
| 8,090,461 B2 | 1/2012 | Ohiaeri et al. |
| 8,174,521 B2 | 5/2012 | Harvill et al. |
| 8,175,931 B2 | 5/2012 | Harvill |
| 8,184,124 B2 | 5/2012 | Edwards et al. |
| 8,190,486 B1 | 5/2012 | Ouimet |
| 8,290,822 B2 | 10/2012 | Gade et al. |
| 8,335,724 B2 | 12/2012 | Sipes et al. |
| 8,429,110 B2 | 4/2013 | Cai et al. |
| 8,458,050 B2 | 6/2013 | Bagley et al. |
| 8,495,072 B1 | 7/2013 | Kapoor |
| 8,495,163 B2 | 7/2013 | Ordille et al. |
| 8,566,714 B1 | 10/2013 | Stringer et al. |
| 8,700,492 B1 | 4/2014 | Scott |
| 8,787,707 B1 | 7/2014 | Steves et al. |
| 8,873,829 B1 | 10/2014 | Tyra |
| 2001/0034668 A1* | 10/2001 | Whitworth ............... 705/27 |
| 2002/0030689 A1 | 3/2002 | Eichel et al. |
| 2002/0068141 A1 | 6/2002 | Pieper et al. |
| 2002/0073001 A1 | 6/2002 | Palmer et al. |
| 2002/0083039 A1 | 6/2002 | Ferrari et al. |
| 2003/0038799 A1 | 2/2003 | Smith |
| 2003/0080978 A1* | 5/2003 | Navab et al. ............ 345/633 |
| 2003/0182402 A1 | 9/2003 | Goodman |
| 2004/0017595 A1 | 1/2004 | Ikeda |
| 2004/0133081 A1 | 7/2004 | Teller et al. |
| 2004/0143644 A1 | 7/2004 | Berton |
| 2004/0169892 A1 | 9/2004 | Yoda |
| 2005/0138078 A1 | 6/2005 | Christenson et al. |
| 2005/0164766 A1 | 7/2005 | Haim et al. |
| 2005/0226498 A1 | 10/2005 | Lee |
| 2005/0234993 A1 | 10/2005 | Ordille et al. |
| 2005/0258234 A1 | 11/2005 | Silverbrook et al. |
| 2005/0271283 A1 | 12/2005 | Dekel et al. |
| 2005/0276444 A1* | 12/2005 | Zhou et al. ............. 382/103 |
| 2006/0004697 A1 | 1/2006 | Lipsky et al. |
| 2006/0038815 A1 | 2/2006 | Loberg |
| 2006/0041421 A1 | 2/2006 | Ta |
| 2006/0107203 A1 | 5/2006 | Schilling |
| 2006/0155612 A1 | 7/2006 | Haeberli |
| 2006/0197775 A1 | 9/2006 | Neal |
| 2007/0033568 A1 | 2/2007 | Barrieau et al. |
| 2007/0067179 A1 | 3/2007 | Kerr et al. |
| 2007/0094204 A1 | 4/2007 | Huelsman et al. |
| 2007/0098234 A1 | 5/2007 | Fiala |
| 2007/0112731 A1 | 5/2007 | Balasubramanian |
| 2007/0124215 A1 | 5/2007 | Simmons |
| 2007/0143082 A1 | 6/2007 | Degnan |
| 2007/0168336 A1 | 7/2007 | Ransil et al. |
| 2007/0174781 A1 | 7/2007 | Begin et al. |
| 2007/0203798 A1 | 8/2007 | Caballero et al. |
| 2007/0226066 A1 | 9/2007 | Brunner |
| 2007/0226155 A1 | 9/2007 | Yu et al. |
| 2008/0069451 A1 | 3/2008 | Ikeda |
| 2008/0091551 A1 | 4/2008 | Olheiser et al. |
| 2008/0162305 A1 | 7/2008 | Rousso et al. |
| 2008/0247674 A1* | 10/2008 | Walch ..................... 382/305 |
| 2008/0285854 A1 | 11/2008 | Kotake et al. |
| 2009/0028414 A1 | 1/2009 | Crandall et al. |
| 2009/0043673 A1 | 2/2009 | Caballero et al. |
| 2009/0043759 A1 | 2/2009 | Danish et al. |
| 2009/0080773 A1 | 3/2009 | Shaw et al. |
| 2009/0089174 A1 | 4/2009 | Brunner |
| 2009/0109214 A1 | 4/2009 | Harvill et al. |
| 2009/0122329 A1 | 5/2009 | Hegemier et al. |
| 2009/0177551 A1 | 7/2009 | Cue et al. |
| 2009/0195538 A1 | 8/2009 | Ryu et al. |
| 2009/0271295 A1 | 10/2009 | Hodge |
| 2009/0282403 A1 | 11/2009 | Poole |
| 2009/0289955 A1 | 11/2009 | Douris et al. |
| 2009/0317010 A1 | 12/2009 | Gerhard et al. |
| 2009/0324100 A1 | 12/2009 | Kletter et al. |
| 2010/0036753 A1 | 2/2010 | Harvill |
| 2010/0048290 A1* | 2/2010 | Baseley et al. ............ 463/25 |
| 2010/0066731 A1 | 3/2010 | Vecore et al. |
| 2010/0066750 A1 | 3/2010 | Yu et al. |
| 2010/0092079 A1 | 4/2010 | Aller |
| 2010/0106283 A1 | 4/2010 | Harvill et al. |
| 2010/0114874 A1 | 5/2010 | Hansson |
| 2010/0124384 A1 | 5/2010 | Edgar et al. |
| 2010/0145492 A1 | 6/2010 | Russell |
| 2010/0185309 A1 | 7/2010 | Ohiaeri et al. |
| 2010/0185529 A1 | 7/2010 | Chesnut et al. |
| 2010/0189316 A1 | 7/2010 | Walch |
| 2010/0238166 A1 | 9/2010 | Tamstorf et al. |
| 2010/0287511 A1 | 11/2010 | Meier et al. |
| 2010/0318476 A1 | 12/2010 | Huelsman et al. |
| 2011/0064388 A1 | 3/2011 | Brown |
| 2011/0098837 A1 | 4/2011 | Yucel et al. |
| 2011/0102440 A1 | 5/2011 | Yuen et al. |
| 2011/0208618 A1 | 8/2011 | Chrustenson et al. |
| 2011/0225038 A1 | 9/2011 | Fontoura et al. |
| 2011/0280447 A1 | 11/2011 | Conwell |
| 2011/0292451 A1 | 12/2011 | Harvill |
| 2011/0305368 A1 | 12/2011 | Osako |
| 2012/0039547 A1 | 2/2012 | Gerhard et al. |
| 2012/0047045 A1 | 2/2012 | Gopikrishna et al. |
| 2012/0117072 A1 | 5/2012 | Gokturk et al. |
| 2012/0123674 A1 | 5/2012 | Perks et al. |
| 2012/0158535 A1 | 6/2012 | Barrieau et al. |
| 2012/0218300 A1 | 8/2012 | Hayakawa |
| 2012/0224743 A1 | 9/2012 | Rodriguez |
| 2012/0262584 A1 | 10/2012 | Strandemar |
| 2013/0054651 A1 | 2/2013 | Shepherd |
| 2013/0057549 A1 | 3/2013 | Beaver et al. |
| 2013/0060801 A1 | 3/2013 | Beaver et al. |
| 2013/0117227 A1 | 5/2013 | Kruglick |
| 2013/0229482 A1 | 9/2013 | Vilcovsky et al. |
| 2013/0304604 A1 | 11/2013 | Hoffman |
| 2014/0193068 A1 | 7/2014 | Harvill et al. |
| 2014/0201187 A1 | 7/2014 | Larson |
| 2014/0215477 A1 | 7/2014 | Chen |
| 2014/0223575 A1 | 8/2014 | Nandi |
| 2014/0270506 A1 | 9/2014 | Harvill et al. |
| 2015/0025994 A1 | 1/2015 | Beaver, III et al. |
| 2015/0095345 A1 | 4/2015 | Arai |

FOREIGN PATENT DOCUMENTS

| | | |
|---|---|---|
| EP | 1365358 A2 | 11/2003 |
| JP | 2001-521659 A | 11/2001 |
| JP | 2003-264740 | 6/2003 |
| JP | 2007-257176 | 10/2007 |

(56) References Cited

FOREIGN PATENT DOCUMENTS

| JP | 2010-117870 | 5/2010 |
|---|---|---|
| JP | 2010-231529 | 10/2010 |
| JP | 2010-287174 A | 12/2010 |
| WO | WO 98/47106 | 10/1998 |
| WO | WO2009/055738 A1 | 4/2009 |
| WO | WO 2009/094724 A1 | 8/2009 |
| WO | WO2009/094724 A1 | 8/2009 |
| WO | WO 2010/022404 A1 | 2/2010 |

OTHER PUBLICATIONS

W. Lee and W. Woo, "Real-time Color Correction for Marker-based Augmented Reality Applications," International Workshop on Ubiquitous VR (IWUVR2009), pp. 32-55, 2009.*

Jun Rekimoto, "Matrix: A Realtime Object Identication and Registration Method for Augmented Reality", Computer Human Interaction, 1998. Proceedings. 3rd Asia Pacific, Jul. 15-17, 1998, pp. 63-68.*

Paul L. Rosin, "Training Cellular Automata for Image Processing", SCIA 2005, LNCS 3540, pp. 195-204, 2005.*

Omar Choudary, Vincent Charvillat, Romulus Grigoras, and Pierre Gurdjos, "MARCH: Mobile Augmented Reality for Cultural Heritage", MM'09, Oct. 19-24, 2009, Beijing, China.*

Schalkoff R J "Syntactic Pattern Recognition (SYNTPR) Overview", Jan. 1, 1992 (1992-81-81), Pattern Recognition: Statistical, Structural and Neural Approaches, Wiley, pp. 127-158,155, XP882485488, I SBN: 978-8-471-52974-3 Technical Fields p. 176-p. 191.*

Cardone A, Gupta SK, Karnik M (2003) A survey of shape similarity assessment algorithms for product design and manufacturing applications. J Comput Inf Science Eng 3:109-118.*

Hirokazu Kato and Mark Billnghurst. "ARToolkit User Manual", Human Interface Technology Lab, University of Washington, dated 2000, 44 pages.

Hirokazu Kato and Mark Billinghurst. "Marker Tracking and HMD Calibration for a Videobased Augmented Reality Conferencing System", In Proceedings of the $2^{nd}$ International, Workshop on Augmented Reality (IWAR 1999), San Francisco, USA Dated Oct. 1999, 10 pages.

Mark Fiala, "Artag, A Fiducial Marker System Using Digital Techniques", In CVRP '05: Proceedings of the 2005 IEEE Computer Society Conference on Computer vision and Pattern Recognition (CVPR) 2:590-596. IEEE Computer Society, dated 2005, 7 pages.

Ryan A. Beasley, "Semiautonomous Medical Image Segmentation Using Seeded Cellular Automation Plus Edge Detector", International Scholarly Research Network ISRN Signal Processing Volume, dated 2012, Article ID 914232, 9 pages.

Daniel Wagner, Tobias Langlotz, and Dieter Schmalstieg, "Robust and Unobtrusive Marker Tracking on Mobile Phones", In ISMAR '08: Proceedings of the $7^{th}$ IEEE/ACM International Symposium on Mixed and Augmented Reality, Washington, DC, USA, Dated 2008, IEEE Computer Society, 4 pages.

Johannes Kohler, Alain Pagani, and Didier Stricker, "Detection and Identification Techniques for Markers Used in Computer Vision", Digital Object Identifier 10.4230/OASics. VLUDS.2010.36, dated 2010, 9 pages.

Homayoun Bagherinia O Roberto Manduchi, "Robust Real-Time Detection of Multi-Color Markers on a Cell Phone", J Real-Time Image Proc., Dated Jun. 3, 2011, 17 pages.

Jun Rekimoto, "Matrix: A Realtime Object Identication and Registration Method for Augmented Reality", Computer Human Interaction, Dated 1998, Proceedings, $3^{rd}$ Asia Pacific, Jul. 15-17, 1998, 6 pages.

Jun Rekimoto and Yuji Ayatsuka, "CyberCode: Designing Augmented Reality Environments with Visual Tags", Proceedings of DARE 2000 on Designing, Dated Apr. 2000, 10 pages.

Martin Hirzer, "Marker Detection for Augmented Reality Applications", Graz University of Technology, Austria, Dated Oct. 27, 2008, 27 pages.

W. Lee and W. Woo, "Real-time Color Correction for Marker-Based Augmented Reality Applications", International Workshop on Ubiquitous VR (IWUVR2009), dated 2009, 4 pages.

Nima Soltani, Mehmet Yilmax, "Using Augmented-Reality on Planar Surfaced for Previewing Décor Changes", Stanford University EE368 Class Project Spring, dated 2010, 5 pages.

Pantida Patirupanusara, "Marker-Based Augmented Reality Magic Book for Anatomical Education", International Conference on Computer and Communication Technologies (ICCCT'2012) May 26-27, 2012, Phuket, 3 pages.

Paul L. Rosin, "Training Cellular Automata for Image Processing", SCIA 2005, LNCS 3540, dated 2005, 10 pages.

Omar Choudary, Vincent Charvillat, Romulus Grigoras, and Pierre Gurdjos,"MARCH: Mobile Augmented Reality for Cultural Heritage", MM'09, Dated Oct. 19-24, 2009, Beijing, China, 2 pages.

Pakemon AR Marker in Sep. 2001 (http://pokemasters.net/forums/showthread.php?t=24845) 17 pages.

"AR tool lets you bring home a virtual Sony Bravia" dated Aug. 29, 2011 (1 page).

Schalkoff R. J., "Syntactic Pattern Recognition (Syntrp) Overview", Pattern Recognition: Statistical, Structural ad Neural Approaches, Wiley, 68 pages.

European Patent Office, "Office Action", in application No. 12181208.5-1238, dated Dec. 6, 2012, 7 pages.

Current Claims in application No. 12181208.5-1238, dated Dec. 2012, 4 pages.

Zhang et al., "Visual Marker Detection and Decoding in AR Systems: A Comparative Study", IEEE, dated 2002, 10 pages.

Internatioanal Searching Authority, "Search Report", in application No. PCT/2012/053536, dated Nov. 9, 2012, 10 pages.

Current Claims PCT/2012/053536, dated Nov. 2012, 5 pages.

International Searching Authority, "Search Report" in application No. PCT/US12/53535, dated Feb. 5, 2013, 12 pages.

Current Claims in application No. PCT/US12/53535, dated Feb. 2013, 5 pages.

"Product Configurator", IBM, available: <http://www.-01.ibm.com/software/commerce/products/products/product-configurator/>, retrieved 11/26/20103.

"Product Configuration System", ORACLE, available: <http://www.bigmachines.com/product_configuration_system.php>, retrieved Nov. 26, 2013.

"Knowledge-based configuration", Wikipedia, available: <http://en.wikipedia.org/wiki/Knowledge-based_configuration>, retrieved Nov. 26, 2013.

"IBM Sterling Configurator—Customize complex products, services and bundles", IBM Software, available: <http://www.-01.ibm.com/software/commerce/products/products/product-configurator/>, Nov. 26, 2013.

U.S. Appl. No. 13/539,788, filed Jul. 2, 2012, Office Action, Dec. 6, 2013.

U.S. Appl. No. 13/601,931, filed Aug. 31, 2012, Notice of Allowance, May 30, 2014.

Capterra Website, "Top Product Configurator Software Products", dated 2014, Reviews of the Best Systems, accessed online <http://www.capterra.com/product-configurator-software> on May 28, 2014, 15pgs.

Japan Patent Office, "Notice of Grounds for Rejection" in application No. 2012-191111, dated Mar. 11, 2014, 4 pages.

European Patent Office, "Search Report" in application No. 14150370.6-1902, dated Apr. 3, 2014, 7 pages.

Ehara et al., "Texture Overlay for Virtual Clothing Based on PCA of Silhouettes", IEEE, dated 2006, 4 pages.

Current Claims in Japan application No. 2012-191111, dated Mar. 2014, 4 pages.

Current Claims in application No. 14150370.6-1902, dated Apr. 3, 2014, 4 pages.

U.S. Appl. No. 14/203,961, filed Mar. 11, 2014, Office Action, May 7, 2014.

U.S. Appl. No. 13/601,941, filed Aug. 31, 2012, Office Action, Apr. 21, 2014.

(56) References Cited

OTHER PUBLICATIONS

U.S. Appl. No. 13/539,788, filed Jul. 2, 2012, Final Office Action, Oct. 8, 2014.
U.S. Appl. No. 14/203,961, filed Mar. 11, 2014, Supplemental Notice of Allowance, Dec. 24, 2014.
U.S. Appl. No. 13/601,941, filed Aug. 31, 2012, Office Action, Jan. 2, 2015.
Schalfoff R, J:, "Syntactic Pattern Recognition SYNTPR Overview" Pattern Recognition Statistical, Structural and Neural Approaches, dated Jan. 1, 1992, 68 pages.
European Patent Office, "Search Report" in application No. 12 181 208.5-1955, dated Feb. 26, 2015, 5 pages.
European Claims in application No. 12 181 208.5-1955, dated Feb. 2015, 4 pages.
U.S. Appl. No. 13/736,844, filed Jan. 8, 2013, Final Office Action, Mar. 13, 2015.
U.S. Appl. No. 13/601,941, filed Aug. 31, 2012, Interview Summary, Mar. 3, 2015.
U.S. Appl. No. 14/203,961, filed Mar. 11, 2014, Notice of Allowance, Sep. 2, 2014.
U.S. Appl. No. 13/736,844, filed Jan. 8, 2013, Office Action, Aug. 21, 2014.
U.S. Appl. No. 13/601,941, filed Aug. 31, 2012, Final Office Action, Sep. 16, 2014.
X. Zhang et al., Visual Marker Detection and Decoding in AR Systems: A Comparative Study, IEEE, ACM, dated Sep. 2002, pp. 97-106.
Tremeau et al., "A Region Growing and Merging Algotithm to Color Segementation" Pattern Recognition, Elsevier, vol. 30, No. 7, dated Jul. 1, 1997, 13 pages.
Hilsmann Anna et al., "Tracking and Retexturing Cloth for Real-Time Virtual Clothing Applications", dated May 4, 2009, 12 pages.
European Patent Office, "Search Report" in application No. 14159664.3-1906, dated Oct. 1, 2014, 7 pages.
Claims in European Application No. 1415966.3-1906, dated Oct. 2014, 4 pages.
U.S. Appl. No. 13/736,844, filed Jan. 8, 2013, Notice of Allowance, May 13, 2015.
U.S. Appl. No. 13/539,788, filed Jul. 2, 2012, Notice of Allowance, Jun. 18, 2015.
Claims in Canadian Application No. 2,785,412, dated Nov. 2015, 5 pages.
Canadian Intellectual Property Office, "Search Report" in application No. 2,785,412, dated Nov. 18, 2015, 4 pages.
U.S. Appl. No. 14/508,918, filed Oct. 7, 2014, Notice of Allowance, mailing date Feb. 25, 2016.
Qin et al., "Product Configuration Flow From Obtaining Customer Requirement to Providing the Final Customized Product", Journal of Software, vol. 7, No. 2., dated 2012, 12 pages.

\* cited by examiner

VISUALIZING A CUSTOM PRODUCT IN SITU

BENEFIT CLAIM

Cross Reference to Related Applications

This application claims benefit under 35 U.S.C. §120 as a Continuation of application Ser. No. 13/604,059, filed Sep. 5, 2012 which claims the benefit under 35 U.S.C. §120 of application Ser. No. 13/539,788, filed Jul. 2, 2012, which claims the benefit under 35 U.S.C. §119(e) of provisional application 61/529,883, filed Aug. 31, 2011, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

This application includes a transmittal under 37 C.F.R. §1.52(e) of a Computer Program Listing Appendix. The Appendix, which comprises the below-listed text file that is IBM PC/XT/AT compatible and MS-Windows compatible. All of the material disclosed in the Computer Program Listing Appendix can be found at the U.S. Patent and Trademark Office archives and is hereby incorporated by reference into the present application for all purposes as if fully set forth herein.

Object Description: ThinningByCellularAutomata.txt, size 41,902 Bytes, created: Aug. 25, 2011

BACKGROUND

Certain approaches described in certain sections of this disclosure and identified as "background" or "prior approaches" are approaches that could be pursued, but not necessarily approaches that have been previously conceived or pursued. Therefore, unless otherwise indicated, it should not be assumed that any of the approaches that are so described actually qualify as prior art merely by virtue of identification as "background" or "prior approaches."

Several computer-automated systems are presently available with which end users or consumers of products may design, preview, and order custom-manufactured products that incorporate images or graphics. Examples of products include wearing apparel, beverage vessels, and accessory items. In a typical system, an end user or consumer uses a general purpose computer terminal, such as a personal computer with a browser, to connect over a public network to a server computer. The user selects a stored graphic image, or uploads a digital image that the user obtained or made. The user selects a type of product to which the graphic image is to be applied and specifies various parameter values relating to the product such as color, size, image placement location, or others. The server computer or terminal generates a rendered image showing how the product will appear after custom manufacture with the specified image applied. The user approves the rendered image and places an order for the product. A manufacturer receives the order data, manufactures the product as specified and provides the custom manufactured product to the user.

One type of product of interest—not offered in typical prior systems—is framed or mounted materials. A frame may comprise wood molding, metal pieces, or plastics. The mounting may include one or more mats or may comprise float mounting. The materials may include digital images of film photographs, original digital art, prints, paintings, animation cells, or any other graphical work or work of the visual arts. Individualized online design and custom manufacture of such framed and mounted material is either impossible or imperfect using existing systems.

DESCRIPTION OF EXAMPLE EMBODIMENTS

Figure 1:
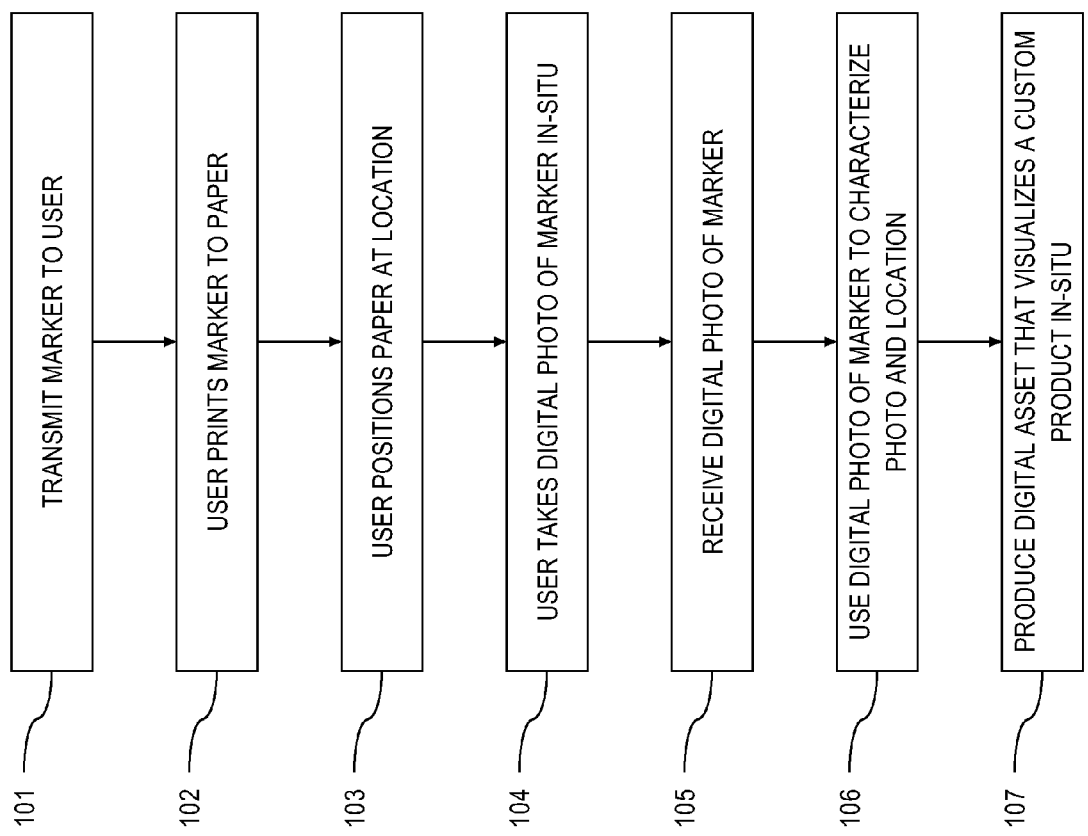
FIG. 1 is a flowchart of a process for visualizing a custom product in-situ.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Visualizing a Custom Product In Situ

An embodiment of the approaches herein may be used in the context of a computer-based system that can receive and store digital images, receive a request to manufacture a custom framed product including an identification of an image to be framed and a type of mat and/or frame, and display a preview image of the custom framed product that simulates the actual appearance of the product as closely as possible. With such a system, the preview image may be highly realistic under idealized lighting and display conditions. However, the appearance of actual framed images may vary widely in different environments. For example, custom framed products typically are displayed by hanging on a wall, but the appearance of the product may vary greatly in environments such as interior rooms with different levels of lighting, kinds of lighting, kinds of walls, wallpaper, reflective surfaces, or other background environment.

Frame elements and mats are represented in 3D models with parameterized values to permit resizing and use with different visual material. For example, 3D models of frame elements may be prepared by placing actual frame stick material in a fixed rig adjacent to a first surface mirror; a laser is projected at a known angle against the surface of the frame stick material and a digital image is formed of the molding together with the laser line and a programmed computer deduces, from the laser line, a geometry of a front surface of the frame stick material and the rear profile is obtained from the first surface mirror. A subsequent image is taken with the laser line shuttered off, to capture an actual surface texture of the molding. The resulting perspective view of the molding surface texture is flattened to permit subsequent mapping of the flattened texture onto a computer-generated 3D model of the molding. For mats, actual thickness may be manually measured and entered as a parameter value, and a flat plan view digital image of the mat texture may be taken and used in 3D texture mapping.

In an embodiment, the preview image of a custom framed product may be modified in a way that closely simulates the actual appearance that the custom framed product will have in a particular environment.

The approaches herein offer numerous benefits in comparison to prior approaches. For example, the design of the example markers shown herein and the nature of recognition is different for characterizing the geometry of the space. The design of the example markers and the processing logic described herein allows for both the characterization of the geometry and also the lighting. This robust characterization enables ensuring that geometry of a visualized product is accurate in the characterized environment. In addition, the logic herein can adjust the nature of the rendering to compensate for the color or lighting of the user environment based on a user image of a single marker and single user-provided photograph.

Further, the system(s) herein accommodate the dynamic nature of custom manufactured products, which can be configured both in the nature of the assembly as well as the nature of the embellishment. The system(s) contemplate the sharing of these characterized environments in an online marketplace together with configured/designed product to be visualized in-situ. The "complete" nature of the system(s) contemplate the characterization of product for configuration/embellishment, enabling users to configure/embellish and visualizing the resultant embodiments in characterized environments.

For purposes of illustrating the in-situ visualization system and method, embodiments described herein refer to a custom framed product. However, the in-situ visualization system and method may also be used to visualize other mountable or displayable custom products for which it is desirable to provide an in-situ visualization of the custom product to users. Examples of other custom products to which the in-situ visualization system and method may be applied include custom manufactured products with user provided images or text (see, for example, related U.S. patent application Ser. No. 12/546,582) and a product on which a customized embroidery has been placed (see, for example, related U.S. patent application Ser. No. 12/257, 016).

A Process for Visualizing a Custom Product In-Situ

With reference to FIG. 1, in an embodiment, a data processing process comprises the following general steps:

A digital representation of a marker is transmitted (block 101) to a user. For example, the user, who may be an end consumer of a commercial custom manufactured product service, uses a computer terminal to connect to a server computer associated with the service. The user either establishes an account with the service or logs into an existing account. The user initiates a process of designing a custom product. The user is prompted to download or print a digital file, such as a PDF document or graphical image file, containing the representation of the marker.

The user prints (block 102) the marker on a sheet of paper. In an embodiment, the printed size of the sheet of paper is stored in the service in association with data describing the marker. For example, the service may store metadata indicating that a particular marker is 8½×11 inches, or metric size A4, or any other suitable size, and the user will be prompted or otherwise required to print the marker on a sheet of that size.

The user positions (block 103) the paper with marker in their environment at a location at which the user wishes to visualize the custom manufactured product. For example, the user attaches the sheet of paper to a wall on which the user plans to mount or display a customizable product.

The user takes (block 104) a digital photo of the marker in-situ. In this context, "in situ" means at the actual location in the environment at which a custom product is to be used or displayed.

The user transmits (block 105) the photo to an In-Situ Visualization service.

As further described herein, the service uses the marker to characterize (block 106) the position, orientation and lighting of the user photograph.

The service produces (block 107) a digital asset that visualizes a custom product in-situ. The digital asset may be produced such that the custom product as visualized by the digital asset reflects the detected position and orientation of the marker in the user photograph and the lighting at the actual location of the marker. For example, the digital asset may be a digital graphic image that the service can cause to be displayed on the user computer terminal to give the user a simulated view of a realistic appearance of the custom manufactured product as if actually mounted or displayed in the user environment at the location where the user previously positioned the sheet. Instead of a digital image, the digital asset may be digital video, digital audio/visual program, or graphical model of the custom product. In an embodiment, displaying the digital asset as described in this paragraph may be implemented in part as described in U.S. application Ser. No. 11/925,716, filed Oct. 26, 2007, the entire contents of which are hereby incorporated by reference for all purposes as if fully set forth herein.

Aspects of components of the preceding general process are now described.

Marker

In an embodiment, a marker may have the following characteristics. The marker may have one or more linear components that may be recognized, using image recognition techniques, as lines in a photograph taken by a digital camera. For example, in an embodiment the marker comprises a plurality of lines that are typically 0.25" to 0.5" inches in width or thickness. Linear components of these sizes are expected to appear sufficiently thick or bold in a user image to permit computer-based recognition of the lines in the user image, even in the presence of background user environmental elements such as wall textures, other mounted materials, doors, wall corners, floors, and other elements. Lines that are too thin may be difficult to recognize as part of the marker, whereas lines that are too thick may be difficult to accurately position in space in relation to the environment.

In an embodiment, the marker has a border when printed and photographed, so that the linear components are isolated from other picture elements in the environment. The border may be a blank margin. Thus, in an embodiment, a blank border separates the linear components from an edge of a printed sheet showing the marker. Therefore, the border enables better recognition of the marker from the environment and breaks or separates the connectivity of the linear components from other image elements that are not part of the marker.

In an embodiment, the linear components are arranged to form a connectivity graph. The connectivity graph is any association of arcs that are connected at points termed nodes to form a plurality of enclosed regions termed polytopes. In an embodiment, each particular marker has a particular connectivity graph with different connectivities as compared to other marker instances as determined by a plurality of features. Example features that may differentiate one connectivity graph from another include aspects of line intersections, number of lines, and number of enclosed regions. Embodiments do not require use of any particular marker format or style; for example, while one example disclosed herein has the general appearance of a rectangular grid, many other geometric arrangements may be used. What is important is that the service has stored metadata describing a reference connectivity graph that is expected to be seen in the user's digital image of the marker and environment.

In an embodiment, the form of the connectivity graph of the marker is distinct in orientation. For example, each marker is provided with one or more features such that changing an orientation or rotation of the marker yields a different visual appearance. This characteristic enables computer analysis of the user digital image to determine the actual orientation that was used for the marker when it was placed in the user environment.

In an embodiment, the spatial relationships of the connectivity graph are recorded, and used as a means of detecting the position and orientation of the marker in the photograph. For example, detecting may involve seeking to recognize known features of nodes, lines, and polytopes in a reference marker that match the same features in the user digital image.

In an embodiment, features of nodes include a count of nodes in the entire marker graph, a count of arcs connecting at a given node, and an adjacency of a node to polytopes having a given count of nodes. These features of nodes can be used to differentiate one connectivity graph from another. That is, if the count of nodes, count of arcs connecting at a given node, and an adjacency to a count of polytopes of a given node count are known, then the same features can be identified when the user's digital image is processed, and the marker can be recognized in the user's digital image only when the counts and adjacency match.

In an embodiment, features of lines also may be used for detection and differentiation. In an embodiment, relevant features include the number of lines (arcs) or count of arcs in the marker graph, and the adjacency of each line to polytopes of a given arc count.

In an embodiment, features of enclosed regions or polytopes also may be used for detection and differentiation. In an embodiment, features relevant to the number of enclosed regions (polytopes) include a count of polytopes in the marker graph and a count of the nodes in each polytope.

In certain embodiments, the connectivity graph of lines may also be user-readable as a symbol, graphic, or legend, such as a company's brand or trademark.

In an embodiment, one or more open spaces are provided in the printed marker and may be unprinted or printed with light colors or tones that provide a means of detecting the lighting of the user site. The open spaces may be termed "light sampling points". Additionally, full printing areas of the line graph of the marker are known, and may be termed "dark sampling points". If the "light sampling points" and "dark sampling points" are detected in a user image of the marker in the environment, then based on luminance values or other data representing the sampling points, the computer can determine a lighting gradient that exists between the sampling points and can modify the appearance of a digital asset to simulate the actual lighting in the user environment.

Colors may comprise black, white, and gray, in one embodiment and can facilitate different types of image analysis. For example, if the computer cannot detect a gray space in a candidate marker in the user image, then the computer can determine that the user image has excessive white level or is "blown out" and needs to be retaken to permit accurate recognition.

The lighting in an environment can appear to have a color bias when recorded by a digital device such as a digital camera. This bias results because the light illuminating the environment may be one or more of a variety of different types including sunlight, incandescent, mercury vapor, fluorescent, etc. that have particular spectral distributions that the human eye sees as white, but that the digital device records as a particular color.

In one embodiment, the marker includes a medium tone gray area that permits accurate recognition of a lighting bias in the user image. Additionally or alternatively, pastel color tones may be used to assist user recognition of color bias in the lighting of the user environment. For example it may be useful to include a known green tone or pink tone in selected areas of the reference marker to aid in recognizing whether the user environment is principally illuminated using fluorescent lamps or incandescent lamps and applying a similar color bias to the digital asset that simulates the custom manufactured product in the environment under the same lighting.

Example Markers

Figure 2:
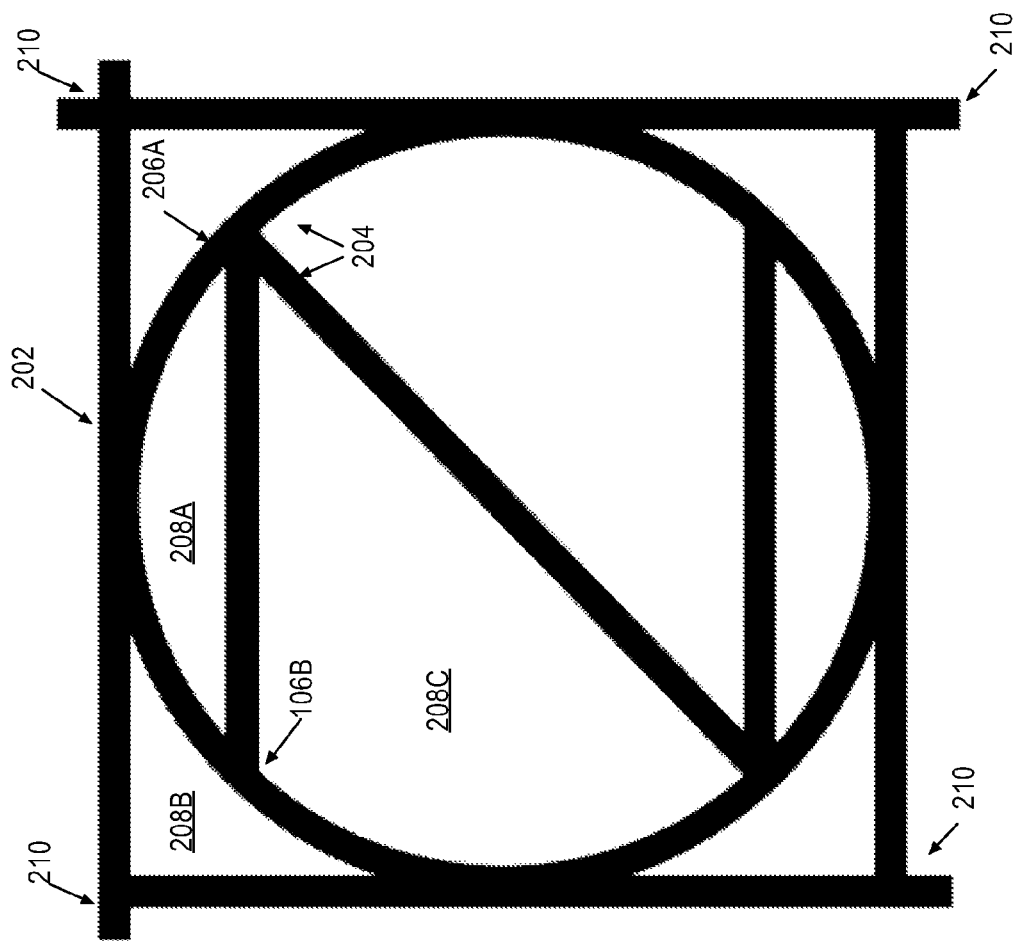
FIG. 2 illustrates an example marker.
Figure 3:
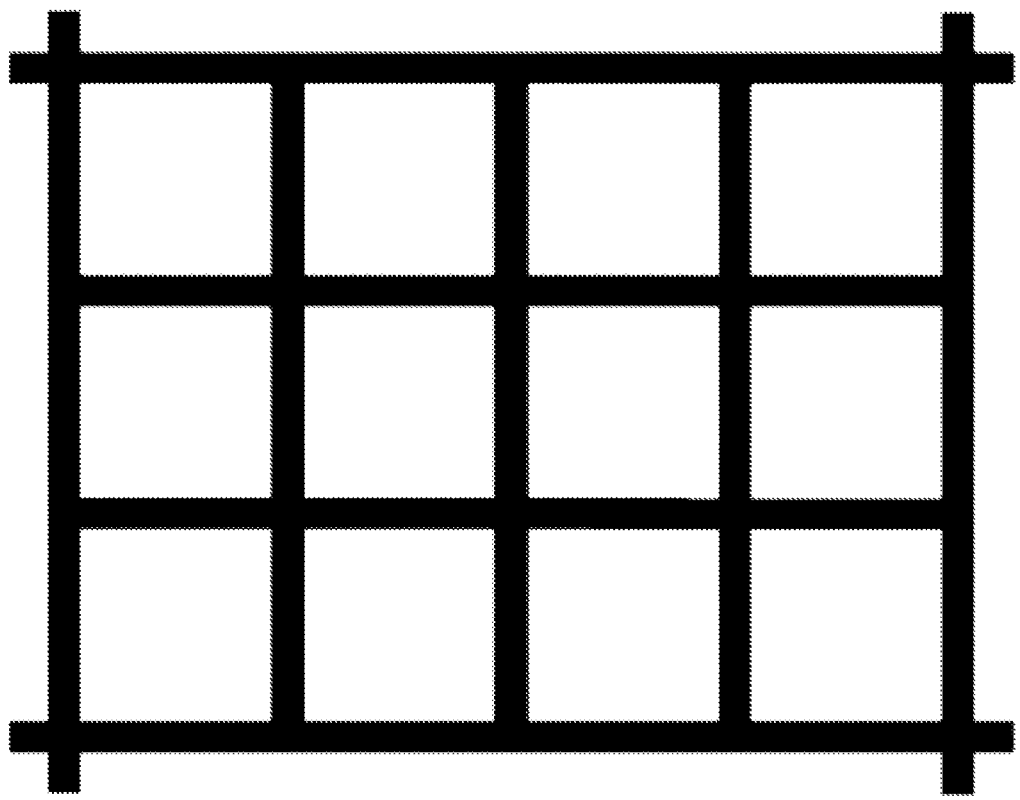
FIG. 3 illustrates an example marker.

FIG. 2 and FIG. 3 illustrate examples of markers. Referring first to FIG. 2, in one embodiment, a marker resembles a trademark of a business entity, in this case, the Z logo of Zazzle Inc., Redwood City, Calif. Marker 202 comprises a plurality of arcs 204. Example nodes 206A, 206B are at intersections of arcs, and the marker defines a plurality of polytopes of which polytopes 208A, 208B, 208C are examples. Corner portions 210 of the marker 202 are non-uniform with respect to the manner of arc intersection so that an orientation of the marker may be detected using computer image analysis techniques.

The count of arcs associated with a particular node also varies; for example, node 206A is at an intersection of four (4) arcs whereas node 206B is at an intersection of three (3) arcs. Therefore when the marker 202 is recognized in a user image the marker may be characterized in terms of the number of nodes and the count of arcs at each node and compared to reference data describing a reference marker to determine if a match occurs. The marker 202 also may be characterized by the number of adjacent polytopes associated with a node; for example, node 206A is associated with four (4) adjacent polytopes whereas node 206B has three (3) adjacencies. Further, the characterization data for a particular marker enables efficient image processing; for example, an image recognition algorithm may be configured to reject a candidate item recognized in a user image as a potential matching marker at the earliest time at which it is determined that a characterization of the item does not match a reference marker. For example, as the computer proceeds to recognize a candidate item, as soon as the computer determines that the candidate item has too few or too many arcs, nodes, or polytopes, the candidate item may be rejected and the process may move on to considering another candidate item.

The number of characterization items for a marker preferably is relatively small to avoid requiring unnecessarily large amounts of data processing time. For example it is known that when a marker is complex and has a large number of arcs, nodes and polytopes, the processing time and storage space needed to accurately recognize the marker may become prohibitive. Therefore, markers having relatively simple connectivity graphs are preferred.

As another example, in FIG. 3, a marker resembles a grid of rectangles. The arrangement of FIG. 3 offers the benefit of fitting a rectangular letter sized sheet of paper well.

In both FIG. 2, FIG. 3, the marker includes a blank border around the perimeter of the marker, lines that are large enough to detect in a user image, and other features such as lines, intersections, and enclosed regions that are uniquely recognizable against a background. Further, FIG. 2, FIG. 3 represent markers that incorporate shapes or graphs that are otherwise uncommon in a natural setting, which improves the performance of the recognition process herein.

In various embodiments, the service may provide a marker that is particular to the end user or customer, or may provide a plurality of different markers that the end user may select from and download. For example, different markers may be associated with or tied to different products, services, users, or classes of products. For example, different products may have different sizes and the user may wish to visualize two different products of different sizes in the same general environment; in such a case the service may provide two different markers of different sizes. Different products of different types also may warrant the use of different markers. For example, a custom painted or printed stretch canvas product might use a different kind of marker than a custom decorated skateboard deck.

In-Situ Visualization Service

In an embodiment, a computer-based in-situ visualization service comprises one or more computer programs or other software elements that are configured to perform the following general tasks: characterizing the user site with the marker; building a digital asset using the found user site data and a photograph or other digital image; rendering the digital asset.

A Process for Characterizing the User Site with a Marker

Figure 4A:
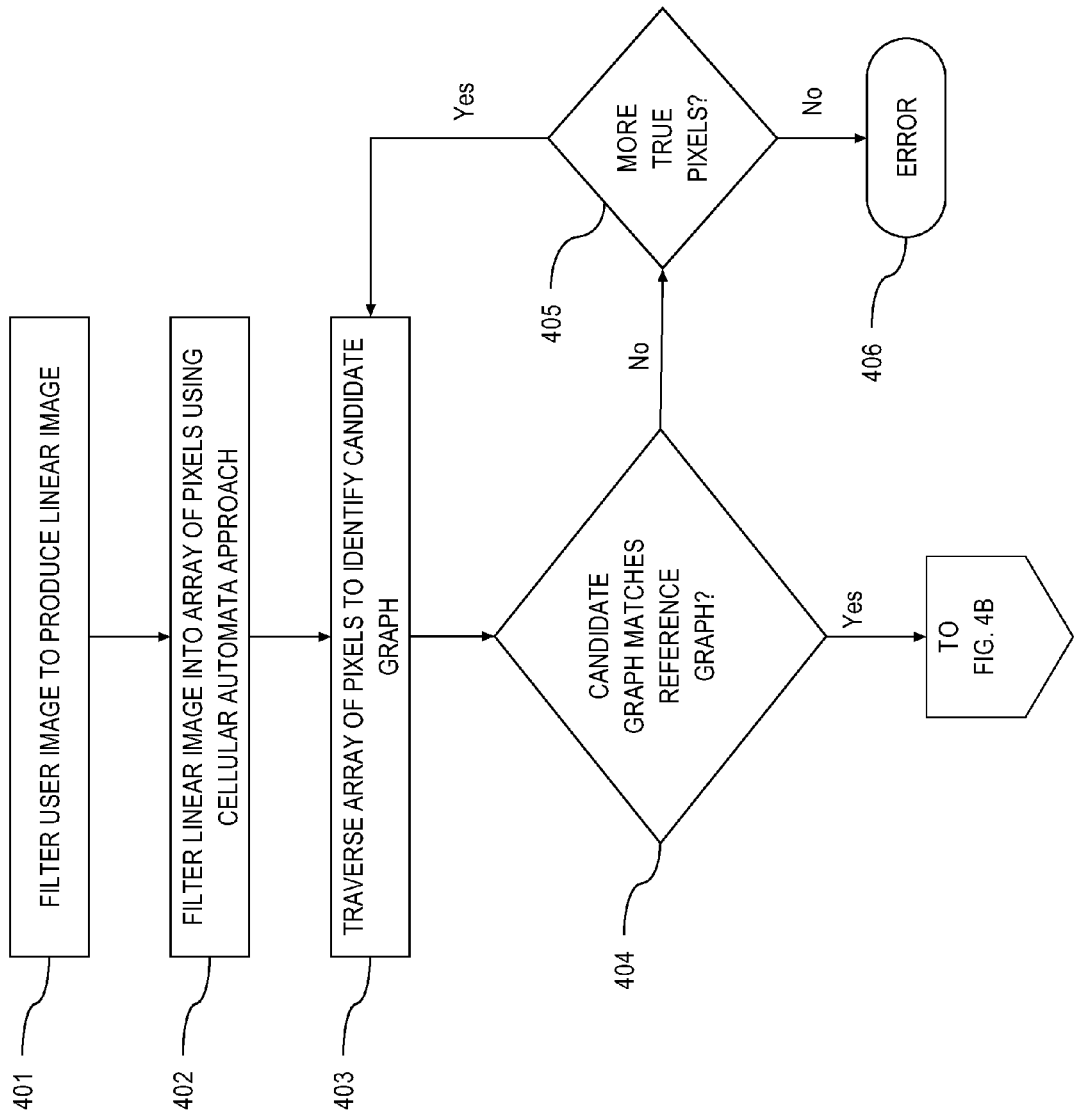
FIGS. 4A-B (collectively FIG. 4) is a flowchart of a process for characterizing a user site with a marker.
Figure 4B:
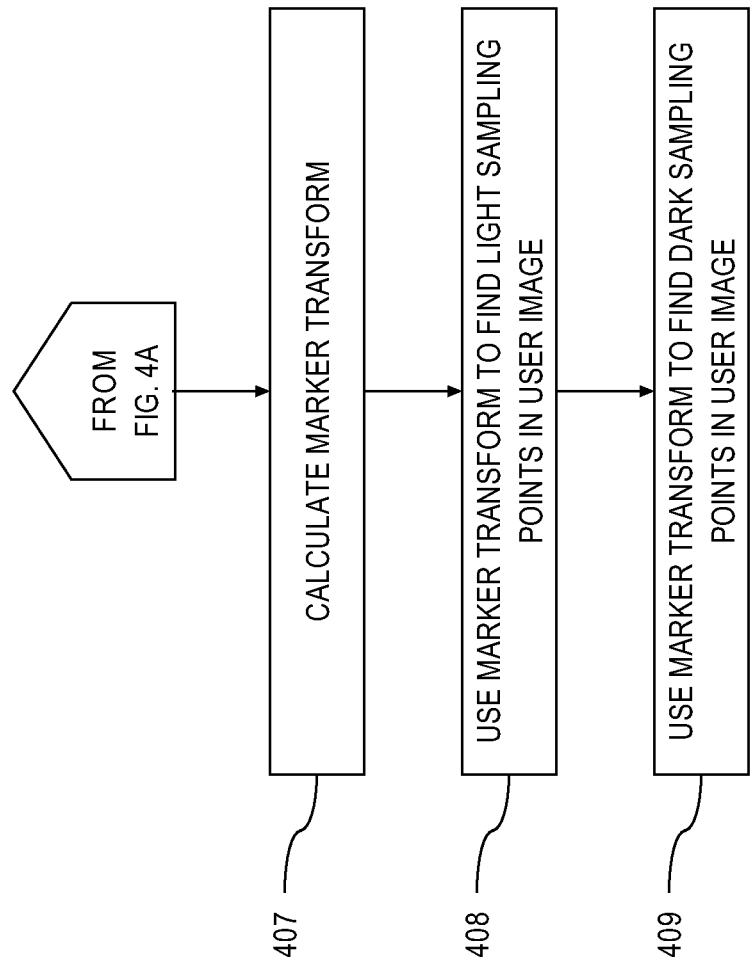

In an embodiment, characterizing the user site with the marker generally comprises digitally recognizing a connected graph based on a reference graph using a process illustrated in flowchart form in FIG. 4.

First, assume that as described above, a user has produced a printed (block 102) copy of a marker, placed (block 103) the printed marker in the user environment at a location at which a custom product will be displayed or mounted, taken (block 104) a digital photograph or image of the environment including the marker, and uploaded (block 105) the user photograph to the service. For example, the user photograph could be a digital image of a portion of the interior of a room in which the marker has been attached to a wall.

The process of FIG. 4 may be implemented in computer logic to recognize the marker in the user photograph, for example, as part of using (block 106) the user photograph of the marker to characterize the user photo, the location and orientation of the marker, and lighting at the marker location:

A linear image is produced by filtering (block 401) the user photograph so that linear features in the size range of the marker lines are left and other linear and non-linear features are filtered out. For example, a thresholded bandpass filter or an edge filter may be used. The result is an output image which when displayed comprises only linear features in the size range of the marker lines as black on a white background.

The linear image is further filtered (block 402) into a Boolean array of pixels using cellular automata, so that linear elements are one (1) pixel in width, and each line is represented in the image by its pixels being set to true. Example value tables for cellular automata are attached in the Appendix. The cellular automata approach uses a rule-based system with threshold neighborhood inputs. In the cellular automata approach, neighbor pixels of a particular pixel under consideration form instructions or opcodes to an automaton that produces a result pixel value based on the input, and the particular pixel is then replaced with the result pixel value. Unlike prior applications of cellular automata, in the present approach cellular automata are applied to line thinning.

The array of pixels is traversed (block 403). When a true pixel is found, a candidate graph is built by traversing connected pixels. For example, when connected pixels are identified then a node is recognized. If no true pixels are found, the algorithm ends. As the candidate graph is created and stored in memory, if the node, arc or polytope counts are greater that of the reference graph, the candidate graph is disposed, and stored values for all connected pixels of the current line network are set to false. In one embodiment, the candidate graph and the reference graph are represented in a computer using a winged edge data structure. Other data structures and models may be used to represent candidate connectivity graph and the reference connectivity graph and the invention is not limited to a winged edge data structure.

By building and using connectivity graphs, the process may rapidly discard candidate graphs that do not meet one or more connectivity criteria of the reference graph. This process is unlike other approaches in which complete recognition and characterization of a candidate graph in the user image may be needed. For example, in the present approach there is no need to complete the recognition of a candidate graph that grows excessively large; it is simply discarded at the earliest opportunity, increasing performance and reducing time to recognize the marker. On completion of the candidate graph, if the node, arc or polytope counts are less than those of the reference graph, the candidate graph is disposed.

If a candidate graph's full set of connectivity characteristics matches (block 404) the reference graph, the algorithm continues at block 407. If a candidate graph is discarded or disposed and there are more true pixels in the array of pixels (block 405), then the traversal of the array of pixels continues at block 403. Otherwise, the algorithm ends (block 406) possibly with a notification to the user that the marker could not be detected in the user photograph.

Once there is a matching candidate graph, the orientation and position of the matching graph in the user photograph is found by calculating (block 407) a marker transform, which maps known nodes in the reference graph to found nodes in the matching graph. Thus, when a matching connectivity graph is identified, the pixel coordinates within the user image of nodes, arcs and polytopes are known, and may be mapped using the marker transform to the reference graph. Point mapping techniques using singular value decomposition may be used, for example, to determine the marker transform.

Once the marker transform is determined, light sampling points may be found (block 408) in the photograph. These points are used to determine a white point for the image, and a luminance gradient or map for rendering the digital asset.

For example, the coordinates in reference space of a first light sampling point may be transformed, using the marker transform, to equivalent points in user image space; at those points, pixel values may be sampled or obtained to determine a baseline white value for the user image. In an embodiment, the luminance gradient is a set of values representing a range of the magnitude of reflected light across the user environment, and may be represented by a set of delta values in image space, for example, $\Delta_u$ and $\Delta_v$ values.

The marker transform may also be used (block 409) to find the dark sampling points in the user image, which are used to set a black point for rendering the digital asset. Thus, information may be extrapolated about the user environment including its geometry and lighting, and appropriate changes may be applied in to the image in terms of chroma spectrum, luminance, brightness, and other attributes so that the image appears, on the user's computer screen, as similar as possible to the actual appearance of the custom manufactured product when it is installed in the user environment.

A Process for Building a Digital Asset with Found User Site Data

Figure 5:
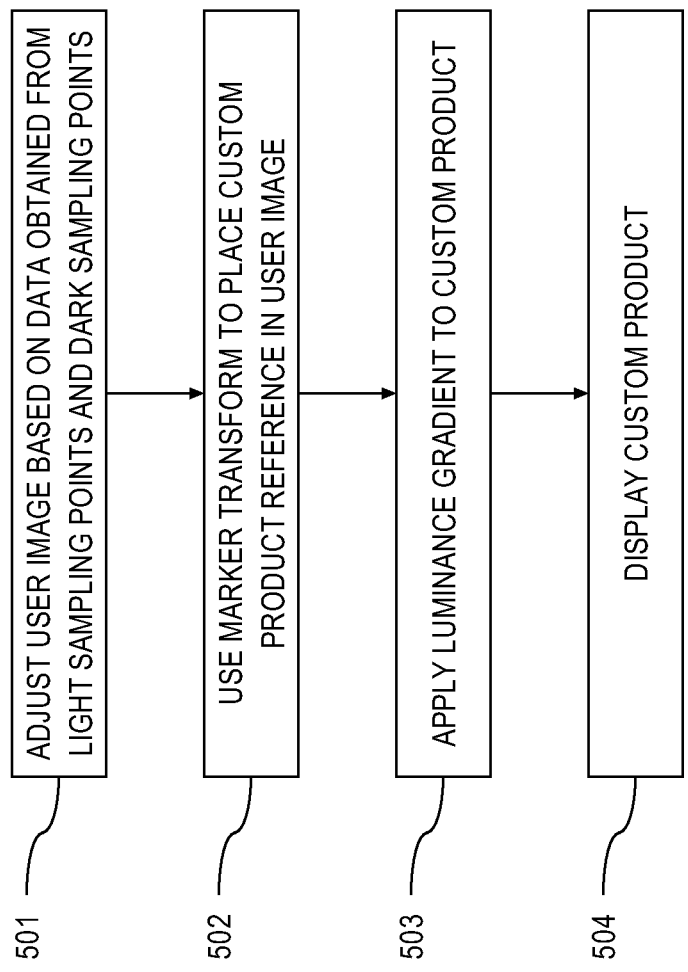
FIG. 5 is a flowchart of a process for building a digital asset with found user site data.

In an embodiment, building a digital asset using the found user site data and a photograph or other digital image may involve the steps illustrated in the flowchart of FIG. 5.

Initially, a digital asset is built using layers as follows. The user photograph is adjusted (block 501) using the data obtained from the light sampling points and the dark sampling points.

A custom product reference is placed (block 502) into the user photograph using the marker transform for placement; the custom product reference may comprise a unique name or identifier, a geometric place holder such as a rectangle within a coordinate system, and that coordinate system transformed using the marker transform, which represents the custom manufactured product in which the user is interested.

The luminance gradient is applied (block 503) to modify the luminance of the custom product to match the light gradient of the user photograph based on a point of known luminance in the user image space.

Second, the custom product is displayed (block 504) using the following steps. In an embodiment, the user chooses the custom product and its attributes by interacting with the service. In an embodiment, the user's in-situ digital asset is loaded. In an embodiment, the rendering asset for the custom product is configured. In an embodiment, the custom product reference is set to the Custom Product asset.

Finally, in an embodiment, the in-situ asset is rendered and sent to the user display unit or browser. In an embodiment, displaying the custom product as described in this paragraph may be implemented as described in U.S. application Ser. No. 11/925,716, filed Oct. 26, 2007, the entire contents of which are hereby incorporated by reference for all purposes as if fully set forth herein.

Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
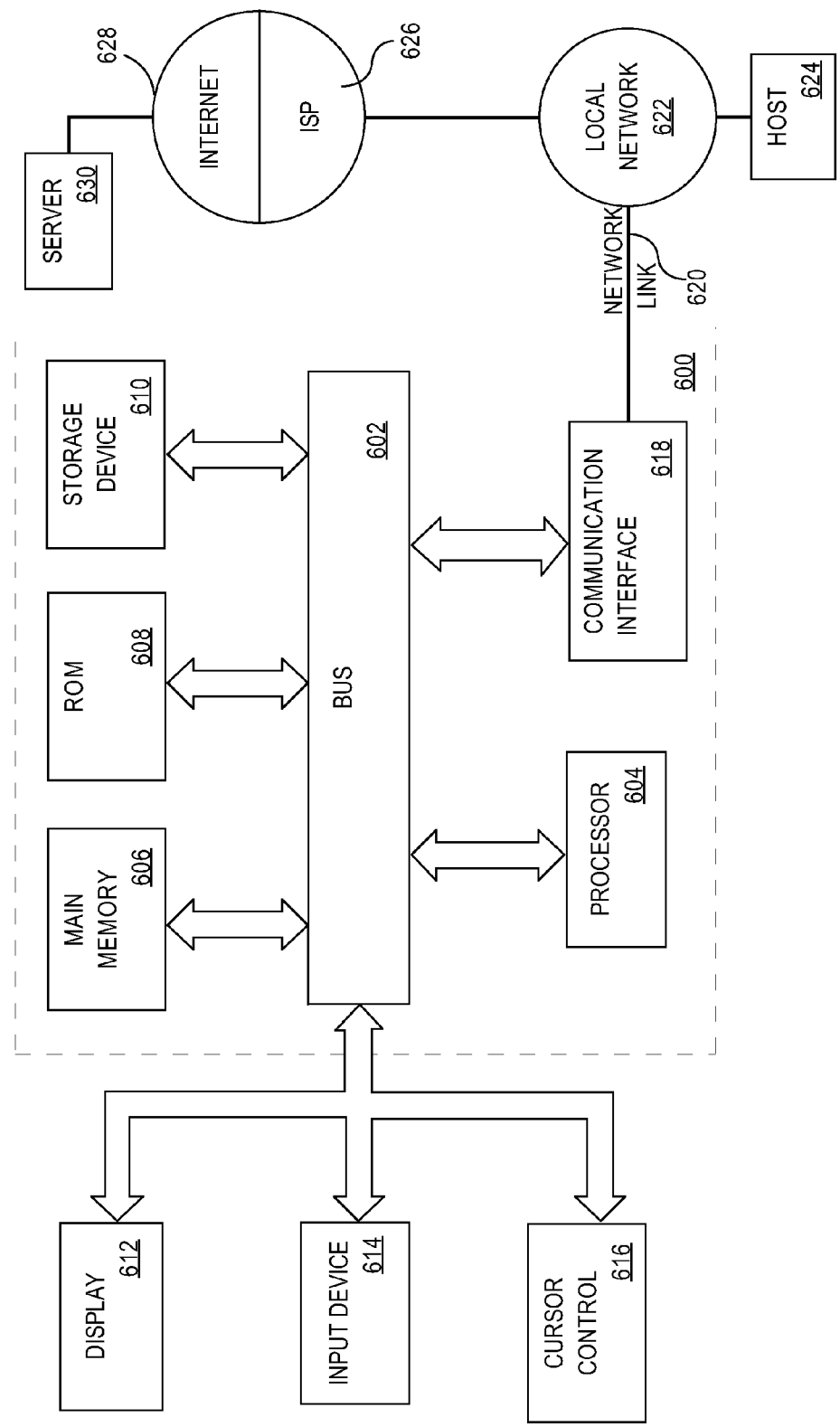
FIG. 6 is a block diagram that illustrates a computer system with which the techniques herein may be implemented.

For example, FIG. 6 is a block diagram that illustrates a computer system 600. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. The input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Appendix Follows

What is claimed is:

1. A method for visualizing a custom product in situ, the method comprising:
   storing first data that represents a reference connectivity graph of a marker; obtaining a digital image of at least the marker;
   analyzing the digital image to generate second data that represents a candidate connectivity graph;
   based on the first data and the second data, determining whether for each first node, in the candidate connectivity graph, a first count of first polytopes that are adjacent to a first node in the candidate connectivity graph matches a second count of second polytopes that are adjacent to a second node, corresponding to the first node, in the reference connectivity graph, and if so:
   generating third data that comprises at least a transform that maps coordinates of nodes of the reference connectivity graph to coordinates of nodes of the candidate connectivity graph;
   using at least the third data to build a digital asset that visualizes the custom product in the digital image;
   wherein the method is performed by one or more computing devices.

2. The method of claim 1, wherein the first data indicates one or more of:
   a count of the nodes of the reference connectivity graph,
   a count of arcs connecting at a particular node of the reference connectivity graph,
   a count of lines or arcs of the reference connectivity graph,
   a count of polytopes of the reference connectivity graph, or
   a count of nodes of a particular polytope of the reference connectivity graph.

3. The method of claim 1, wherein the second data indicates one or more of:
   a count of the nodes of the reference connectivity graph,
   a count of arcs connecting at a particular node of the reference connectivity graph,
   a count of lines or arcs of the reference connectivity graph,
   a count of polytopes of the reference connectivity graph, or
   a count of nodes of a particular polytope of the reference connectivity graph.

4. The method of claim 1, wherein the marker comprises one or more colored open spaces for aiding a digital image analysis technique applied to the digital image in detecting lighting in an environment in which the marker was photographed.

5. The method of claim 4, wherein at least one of the one or more colored open spaces is colored in a medium tone gray or a pastel color tone for aiding the digital image analysis technique in detecting color bias of lighting in the environment in which the marker was photographed.

6. The method of claim 1, further comprising applying a thresholded bandpass filter or an edge filter to the digital image to produce a digital image that comprises linear features in a size range of lines of the marker as black on a white background.

7. The method of claim 6, further comprising using a rule-based cellular automata with thresholded neighborhood inputs to thin at least one of the linear features.

8. The method of claim 1, further comprising determining an orientation or position of the marker in the digital image using the third data.

9. The method of claim 8, further comprising using a point mapping technique involving singular value decomposition to determine the third data.

10. The method of claim 1, further comprising using the third data to transform coordinates of a light sampling point in a coordinate space of the marker to an equivalent point in a coordinate space of the digital image.

11. The method of claim 10, further comprising sampling pixel values at the equivalent point to determine a baseline white value.

12. The method of claim 1, wherein building the digital asset comprises placing a custom product reference into the digital image using the third data for placement.

13. The method of claim 1, further comprising:
analyzing the digital image to detect one or more light sampling points and one or more dark sampling points;
determining a lighting gradient that exists between certain sampling points;
modifying luminance of the custom product to match the lighting gradient.

14. One or more non-transitory computer-readable media storing instructions which, when executed by one or more processors, cause performance of a method for visualizing a custom product in situ, the method comprising:
storing first data that represents a reference connectivity graph of a marker; obtaining a digital image of at least the marker;
analyzing the digital image to generate second data that represents a candidate connectivity graph;
based on the first data and the second data, determining whether for each first node, in the candidate connectivity graph, a first count of first polytopes that are adjacent to a first node in the candidate connectivity graph matches a second count of second polytopes that are adjacent to a second node, corresponding to the first node, in the reference connectivity graph, and if so:
generating third data that comprises at least a transform that maps coordinates of nodes of the reference connectivity graph to coordinates of nodes of the candidate connectivity graph;
using at least the third data to build a digital asset that visualizes the custom product in the digital image;
wherein the method is performed by one or more computing devices.

15. The one or more non-transitory computer-readable media of claim 14, wherein the first data indicates one or more of:
a count of the nodes of the reference connectivity graph,
a count of arcs connecting at a particular node of the reference connectivity graph,
a count of lines or arcs of the reference connectivity graph,
a count of polytopes of the reference connectivity graph, or
a count of nodes of a particular polytope of the reference connectivity graph.

16. The method of claim 14, wherein the second data indicates one or more of:
a count of the nodes of the reference connectivity graph,
a count of arcs connecting at a particular node of the reference connectivity graph,
a count of lines or arcs of the reference connectivity graph,
a count of polytopes of the reference connectivity graph, or
a count of nodes of a particular polytope of the reference connectivity graph.

17. The one or more non-transitory computer-readable media of claim 14, wherein the marker comprises one or more colored open spaces for aiding a digital image analysis technique applied to the digital image in detecting lighting in an environment in which the marker was photographed.

18. The one or more non-transitory computer-readable media of claim 17, wherein at least one of the one or more colored open spaces is colored in a medium tone gray or a pastel color tone for aiding the digital image analysis technique in detecting color bias of lighting in the environment in which the marker was photographed.

19. The one or more non-transitory computer-readable media of claim 14, the method further comprising applying a thresholded bandpass filter or an edge filter to the digital image to produce a digital image that comprises linear features in a size range of lines of the marker as black on a white background.

20. The one or more non-transitory computer-readable media of claim 19, the method further comprising using a rule-based cellular automata with thresholded neighborhood inputs to thin at least one of the linear features.

21. The one or more non-transitory computer-readable media of claim 14, the method further comprising determining an orientation or position of the marker in the digital image using the third data.

22. The method of claim 21, the method further comprising using a point mapping technique involving singular value decomposition to determine the third data.

23. The one or more non-transitory computer-readable media of claim 14, the method further comprising using the third data to transform coordinates of a light sampling point in a coordinate space of the marker to an equivalent point in a coordinate space of the digital image.

24. The one or more non-transitory computer-readable media of claim 23, the method further comprising sampling pixel values at the equivalent point to determine a baseline white value.

25. The one or more non-transitory computer-readable media of claim 14, wherein building the digital asset comprises placing a custom product reference into the digital image using the third data for placement.

26. The one or more non-transitory computer-readable media of claim 14, the method further comprising:

analyzing the digital image to detect one or more light sampling points and one or more dark sampling points;

determining a lighting gradient that exists between certain sampling points;

modifying luminance of the custom product to match the lighting gradient.

* * * * *